US012076986B2

(12) United States Patent
Saito

(10) Patent No.: US 12,076,986 B2
(45) Date of Patent: Sep. 3, 2024

(54) MANIFOLD, HEAD MODULE, LIQUID DISCHARGE UNIT, AND LIQUID DISCHARGING APPARATUS

(71) Applicant: Masahiro Saito, Kanagawa (JP)

(72) Inventor: Masahiro Saito, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 130 days.

(21) Appl. No.: 17/861,277

(22) Filed: Jul. 11, 2022

(65) Prior Publication Data

US 2023/0030551 A1 Feb. 2, 2023

(30) Foreign Application Priority Data

Jul. 27, 2021 (JP) ................................ 2021-122332

(51) Int. Cl.
*B41J 2/14* (2006.01)
*B41J 2/175* (2006.01)

(52) U.S. Cl.
CPC ............ *B41J 2/14* (2013.01); *B41J 2/17523* (2013.01); *B41J 2002/14419* (2013.01)

(58) Field of Classification Search
CPC ...................... B41J 2/14; B41J 2/17523; B41J 2002/14419; B41J 2/14201; B41J 2/17509; B41J 2/175
See application file for complete search history.

(56) References Cited

FOREIGN PATENT DOCUMENTS

| | | | |
|---|---|---|---|
| JP | H09277561 A | * | 10/1997 |
| JP | 2009-051145 | | 3/2009 |
| JP | 2012-106513 | | 6/2012 |
| JP | 2013-082140 | | 5/2013 |

OTHER PUBLICATIONS

Ijima, Takayuki, Ink Jet Type Recorder (JP H09277561 A), Oct. 28, 1997, Whole Document (Year: 1997).*

* cited by examiner

*Primary Examiner* — Lisa Solomon
(74) *Attorney, Agent, or Firm* — XSENSUS LLP

(57) ABSTRACT

A manifold includes: a liquid chamber including an elastic damper, the liquid chamber configured to store a liquid; multiple head couplers on a lower end of the liquid chamber, the multiple head couplers configured to be respectively coupled to multiple liquid discharge heads and spaced apart in a longitudinal direction of the liquid chamber; and a tank coupler on an upper end of the liquid chamber, the tank coupler configured to be coupled to a tank configured to store liquid to be supplied to or discharged from the manifold, wherein a length of the liquid chamber increases from the tank coupler on the upper end toward the multiple head couplers on the lower end of the liquid chamber.

16 Claims, 7 Drawing Sheets

MANIFOLD, HEAD MODULE, LIQUID DISCHARGE UNIT, AND LIQUID DISCHARGING APPARATUS

CROSS-REFERENCE TO RELATED APPLICATIONS

This patent application is based on and claims priority pursuant to 35 U.S.C. § 119(a) to Japanese Patent Application No. 2021-122332, filed on Jul. 27, 2021, in the Japan Patent Office, the entire disclosure of which is incorporated by reference herein.

BACKGROUND

Technical Field

The present embodiment relates to a manifold, a head module, a liquid discharge unit, and a liquid discharging apparatus.

Related Art

A manifold includes an elastic body constituting part of a wall to store liquid and is coupled to a plurality of liquid discharge heads.

As the manifold, a distribution tank in a rectangular-parallelepiped shape includes a flexible member in a rectangular shape that is an elastic body constituting part of a wall of the distribution tank.

SUMMARY

A manifold includes: a liquid chamber including an elastic damper, the liquid chamber configured to store a liquid; multiple head couplers on a lower end of the liquid chamber, the multiple head couplers configured to be respectively coupled to multiple liquid discharge heads and spaced apart in a longitudinal direction of the liquid chamber; and a tank coupler on an upper end of the liquid chamber, the tank coupler configured to be coupled to a tank configured to store liquid to be supplied to or discharged from the manifold, wherein a length of the liquid chamber increases from the tank coupler on the upper end toward the multiple head couplers on the lower end of the liquid chamber.

A head module includes multiple liquid discharge heads; and the manifold.

A liquid discharge device includes the head module.

A liquid discharging apparatus includes the liquid discharge device.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
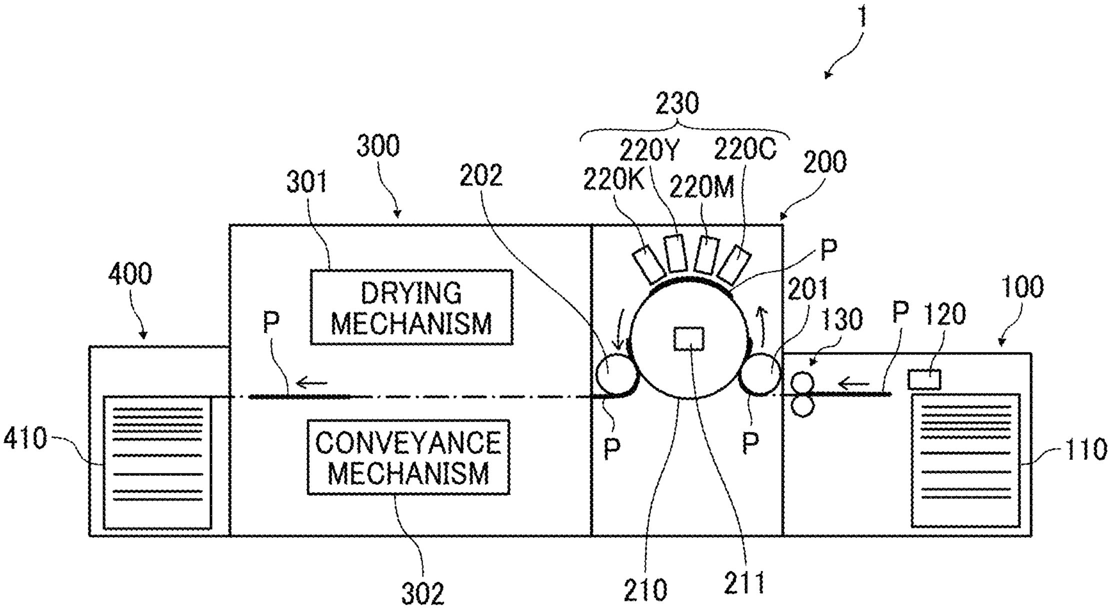
FIG. 1 is a schematic diagram illustrating a schematic configuration of an inkjet recording apparatus in the present embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

In the following, the present embodiment is described with reference to the accompanying drawings.

First Embodiment

[General Description]

FIG. 1 is a schematic diagram illustrating a schematic configuration of an inkjet recording apparatus in a first embodiment as an example of a liquid discharging apparatus according to the present embodiment. In the first embodiment, an inkjet recording apparatus 1 chiefly includes a paper feeding section 100, an image forming section 200, a drying section 300, and a paper ejecting section 400.

The inkjet recording apparatus 1 forms, in the image forming section 200, an image on a sheet P as a recording material that is a sheet of paper fed from the paper feeding section 100, with ink as liquid for image formation. The inkjet recording apparatus 1 then dries, in the drying section 300, the ink as adhered on the sheet P before ejecting the sheet P through the paper ejecting section 400.

The inkjet recording apparatus 1 is an example of a liquid discharge apparatus that discharges a liquid onto a medium.

[Paper Feeding Section]

The paper feeding section 100 chiefly includes a paper feed tray 110 where a plurality of sheets P are loaded, a feeding device 120 that delivers the sheets P one by one from the paper feed tray 110, and a pair of register rollers 130 that feeds the sheets P into the image forming section 200. Any feeding devices including a device using a roller or a runner and a device employing air suction are usable as the feeding device 120. After a leading edge of the sheet P delivered by the feeding device 120 from the paper feed tray 110 reaches the pair of register rollers 130, the pair of register rollers 130 is driven with specified timing so as to feed the sheet P to the image forming section 200. In the first embodiment, the paper feeding section 100 is not limited in configuration as long as the configuration allows the delivery of the sheet P to the image forming section 200.

[Image Forming Section]

The image forming section 200 chiefly includes a transfer barrel 201 that receives the sheet P as fed and transfers the received sheet P to a sheet conveyance drum 210, and the sheet conveyance drum 210, which carries the sheet P conveyed by the transfer barrel 201 on an outer peripheral face and conveys the sheet P. The image forming section 200 further includes a liquid discharge device 230 that discharges ink toward the sheet P carried by the sheet conveyance drum 210, and a transfer barrel 202 that transfers the sheet P conveyed by the sheet conveyance drum 210 to the drying section 300.

The sheet P as conveyed from the paper feeding section 100 to the image forming section 200 is grasped by the leading edge by a sheet gripper provided on a surface of the transfer barrel 201 and conveyed in accordance with a surface movement of the transfer barrel 201. The sheet P conveyed by the transfer barrel 201 is transferred to the sheet conveyance drum 210 in a position where the transfer barrel 201 faces the sheet conveyance drum 210.

A sheet gripper is also provided on a surface of the sheet conveyance drum 210 so as to grasp the leading edge of the sheet P by the sheet gripper. In the surface of the sheet conveyance drum 210, a plurality of suction holes are dispersedly formed, and a sucked air current directed inside the sheet conveyance drum 210 is generated in each suction hole by a suction device 211. The sheet P transferred from the transfer barrel 201 to the sheet conveyance drum 210 is grasped by the leading edge by the sheet gripper and, at the same time, attracted by the sucked air currents to the surface of the sheet conveyance drum 210 so as to convey the sheet P in accordance with a surface movement of the sheet conveyance drum 210.

The liquid discharge device 230 in the first embodiment discharges four color inks in cyan (C), magenta (M), yellow (Y), and black (K) to form an image. The liquid discharge device 230 includes head devices 220C, 220M, 220Y, and 220K with individual liquid discharge heads for the respective inks. The liquid discharge heads are not limited in configuration as long as the configuration allows the discharge of liquid. A liquid discharge head to discharge a special ink, such as a white ink, a gold ink, and a silver ink, or a liquid discharge head to discharge liquid not used for the image formation, such as a surface coating liquid, may be provided as required.

The liquid discharge heads of the head devices 220C, 220M, 220Y, and 220K are each controlled with respect to a discharging operation, based on a driving signal according to image information. When the sheet P carried by the sheet conveyance drum 210 passes through a region opposite to the liquid discharge device 230, the respective color inks are discharged from the liquid discharge heads of the head devices 220C, 220M, 220Y, and 220K so as to form an image according to the image information. In the first embodiment, the image forming section 20M is not limited in configuration as long as the configuration allows the inks to be adhered onto the sheet P so as to form an image.

[Drying Section]

The drying section 300 chiefly includes a drying mechanism 301 for drying the inks as adhered on the sheet P in the image forming section 200, and a conveyance mechanism 302 that conveys the sheet P conveyed from the image forming section 200. The sheet P as conveyed from the image forming section 200 is received by the conveyance mechanism 302, then so conveyed as to pass through the drying mechanism 301 and transferred to the paper ejecting section 400. When the sheet P passes through the drying mechanism 301, the inks on the sheet P are subjected to a drying process. As a result, liquid such as water in the inks evaporates, the inks are rigidly fixed onto the sheet P, and the curl of the sheet P is suppressed.

[Paper Ejecting Section]

The paper ejecting section 400 chiefly includes a paper ejection tray 410 where a plurality of sheets P are loaded. The sheets P conveyed from the drying section 300 are sequentially stacked on the paper ejection tray 410 and as such held. In the first embodiment, the paper ejecting section 400 is not limited in configuration as long as the configuration allows the ejection of the sheet P.

[Other Operation Sections]

The inkjet recording apparatus 1 in the first embodiment includes the paper feeding section 100, the image forming section 200, the drying section 300, and the paper ejecting section 400, while another operation section may be added as appropriate. It is possible, for instance, to add a preprocessing section to perform preprocessing for the image formation between the paper feeding section 100 and the image forming section 200 or to add a postprocessing section to perform postprocessing for the image formation between the drying section 300 and the paper ejecting section 400.

The preprocessing section performs, for instance, a treatment liquid application process for applying, to the sheet P, a treatment liquid that reacts with the inks so as to suppress blur, while the contents of the preprocessing are not particularly limited. The postprocessing performed by the postprocessing section is exemplified by a sheet reversing conveyance process for reversing the sheet P, on which an image has been formed in the image forming section 200, and sending the reversed sheet P again to the image forming section 200 so as to form images on both sides of the sheet P. The postprocessing is further exemplified by a process for binding a plurality of sheets P each having an image formed on the relevant sheet P. The contents of the postprocessing are not particularly limited either.

Figure 2:
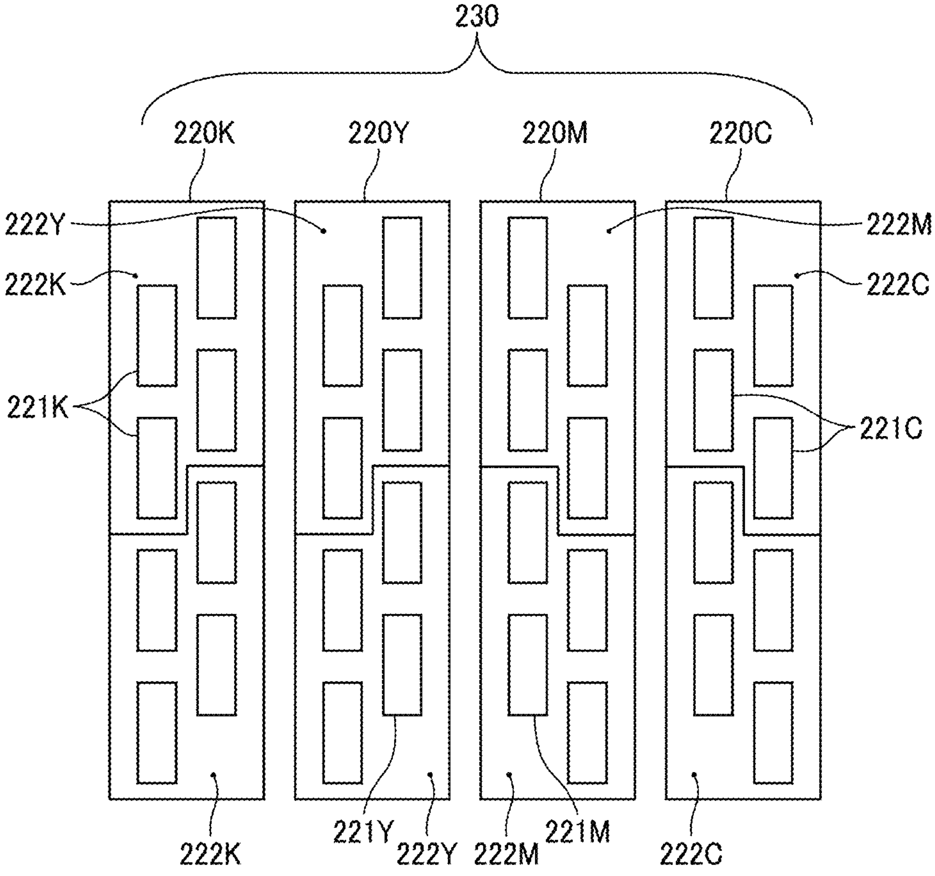
FIG. 2 is a diagram illustrating a schematic configuration of a liquid discharge unit.

FIG. 2 is a diagram illustrating a schematic configuration of the liquid discharge device 230. In the head devices 220C, 220M, 220Y, and 220K of the liquid discharge device 230 in the first embodiment, a plurality of liquid discharge heads 221C, a plurality of liquid discharge heads 221M, a plurality of liquid discharge heads 221Y, and a plurality of liquid discharge heads 221K are zigzaggedly arrayed in a main scanning direction (axial direction of the sheet conveyance drum 210), respectively. Specifically, each head device includes two head groups each including a plurality of liquid discharge heads arranged at regular intervals in the main scanning direction, and the two head groups are made different in position in the main scanning direction.

In each of the head devices 220C, 220M, 220Y, and 220K, two head modules 222 each including two liquid discharge heads 221 of each of the two head groups (four liquid discharge heads 221 in total) are aligned in the main scanning direction.

Figure 3:
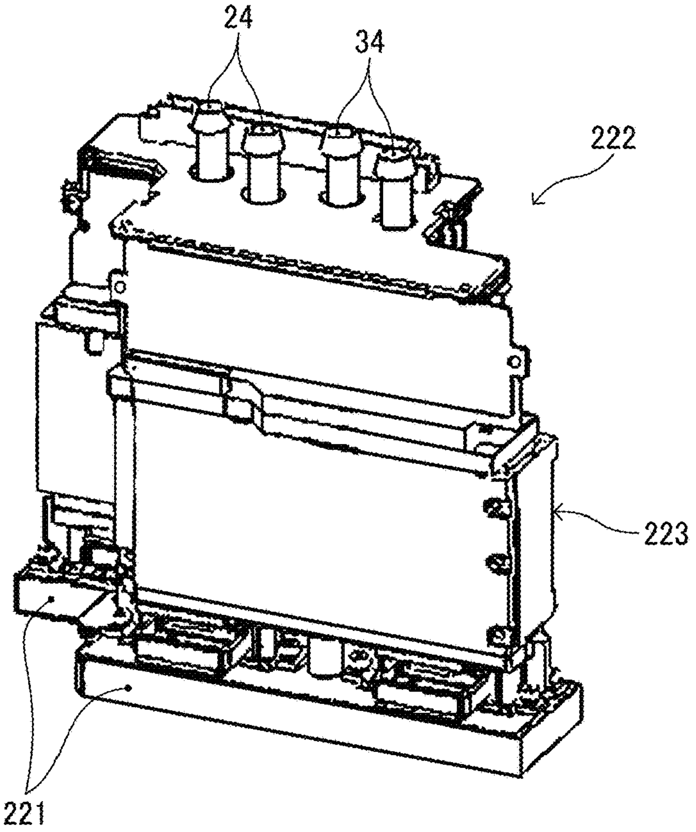
FIG. 3 is a schematic perspective view of a head module.
Figure 4:
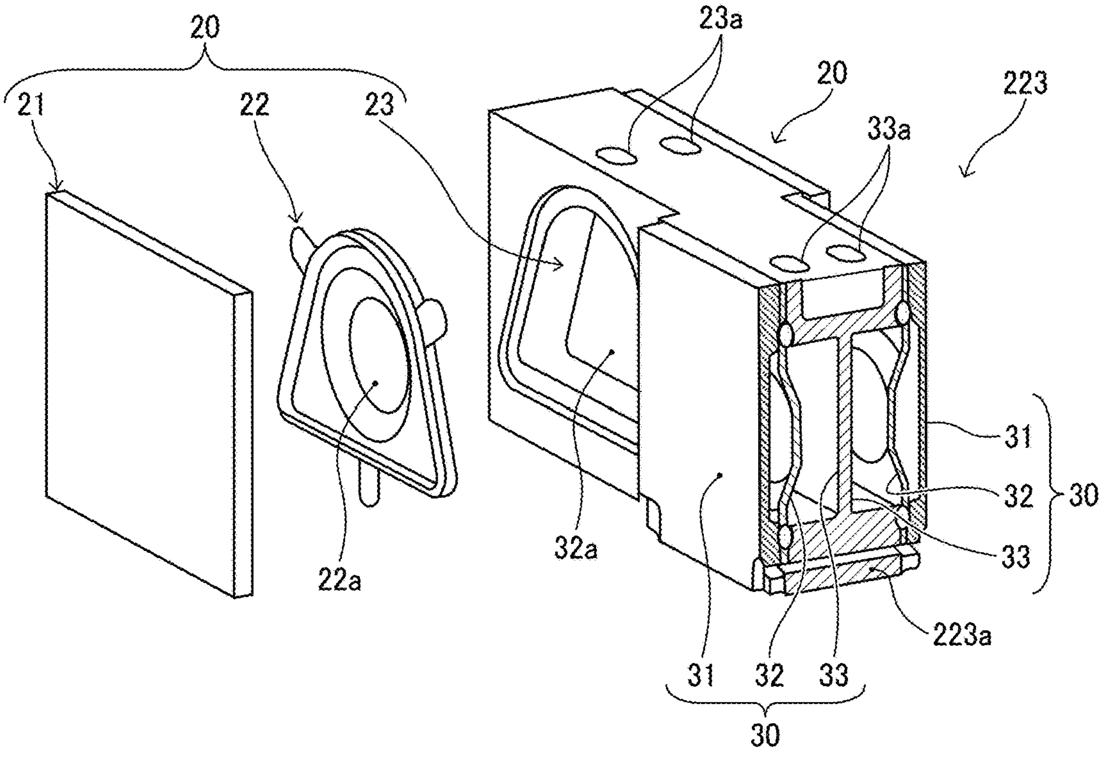
FIG. 4 is an exploded perspective view of a manifold.

FIG. 3 is a schematic perspective view of the head module 222, and FIG. 4 is an exploded perspective view of a manifold part 223. As illustrated in FIG. 3, the head module 222 includes the manifold part 223. The manifold part 223 includes two supply manifolds 20 respectively supply liquid to two liquid discharge heads 221, and two discharge manifolds 30 to each of which liquid is ejected from two liquid discharge heads 221 as illustrated in FIG. 4.

The supply manifold 20, which supplies liquid to two liquid discharge heads 221 of one of the two head groups, and the supply manifold 20, which supplies liquid to two liquid discharge heads 221 of the other, are provided back to back with each other. The discharge manifold 30, to which liquid is ejected from two liquid discharge heads 221 of one head group, and the discharge manifold 30, to which liquid is ejected from two liquid discharge heads 221 of the other head group, are provided back to back with each other.

The supply manifold 20 and the discharge manifold 30 are identical in shape, and include liquid chambers 23 and 33 in a concave shape provided on a base member 223*a* of the manifold part 223 and dampers 22 and 32 as elastic bodies to tightly seal the liquid chambers 23 and 33, respectively. In addition, the supply manifold 20 and the discharge manifold 30 include protective covers 21 and 31 (see FIG. 4) to protect the dampers 22 and 32, respectively. The supply manifold 20 and the discharge manifold 30 may be collectively referred to as "manifolds 20 and 30".

The dampers 22 and 32 each include a thin rubber film with a thickness of 1.0 mm or less, and have central portions 22*a* and 32*a* protruding toward the liquid chambers 23 and 33, respectively, and specified gaps are formed between the dampers 22 and 32 on one hand and the protective covers 21 on the other.

In an upper portion of the base member 223*a*, a liquid inlet 23*a* of the supply manifold 20 is provided. To the liquid inlet 23*a*, a supply pipe adapter 24, to which one end of a supply pipe is to be fitted, is fitted. The other end of the supply pipe is fitted to a supply sub tank 15 (see FIG. 5). A liquid outlet 33*a* of the discharge manifold 30 is also provided in the upper portion of the base member 223*a*. A discharge pipe adapter 34 is fitted to the liquid outlet 33*a*. One end of a discharge pipe is to be fitted to the discharge pipe adapter 34. The other end of the discharge pipe is fitted to a discharge sub tank 16 (see FIG. 5).

The dampers 22 and 32 absorb the vibration as propagated to the liquid in the supply manifold 20 and the discharge manifold 30, which vibration has been caused by pressure fluctuation generated in liquid chambers of the liquid discharge heads 221 during a liquid discharging operation. Consequently, generation of so-called crosstalk is suppressed. In crosstalk, vibration of one liquid discharge head is propagated to the other liquid discharge head through the supply manifold 20 and the discharge manifold 30. In the first embodiment, a thin rubber film is used for the dampers 22 and 32, while a resin film or a thin metal film may be used.

In some comparative cases, an elastically deformable damper part is used to form part of a wall constituting a common chamber of respective liquid discharge heads, so as to absorb, in the common chamber, vibration due to pressure fluctuation generated in liquid chambers of the liquid discharge heads. The configuration, in which the damper part is provided on the common chamber of the respective liquid discharge heads, enlarges the common chamber, leading to the increase in size of the respective liquid discharge heads. In the first embodiment, the dampers 22 and 32 are provided on the supply manifold 20 and the discharge manifold 30, which makes it possible to downsize the respective liquid discharge heads 221 so as to downsize the head modules 222.

Figure 5:
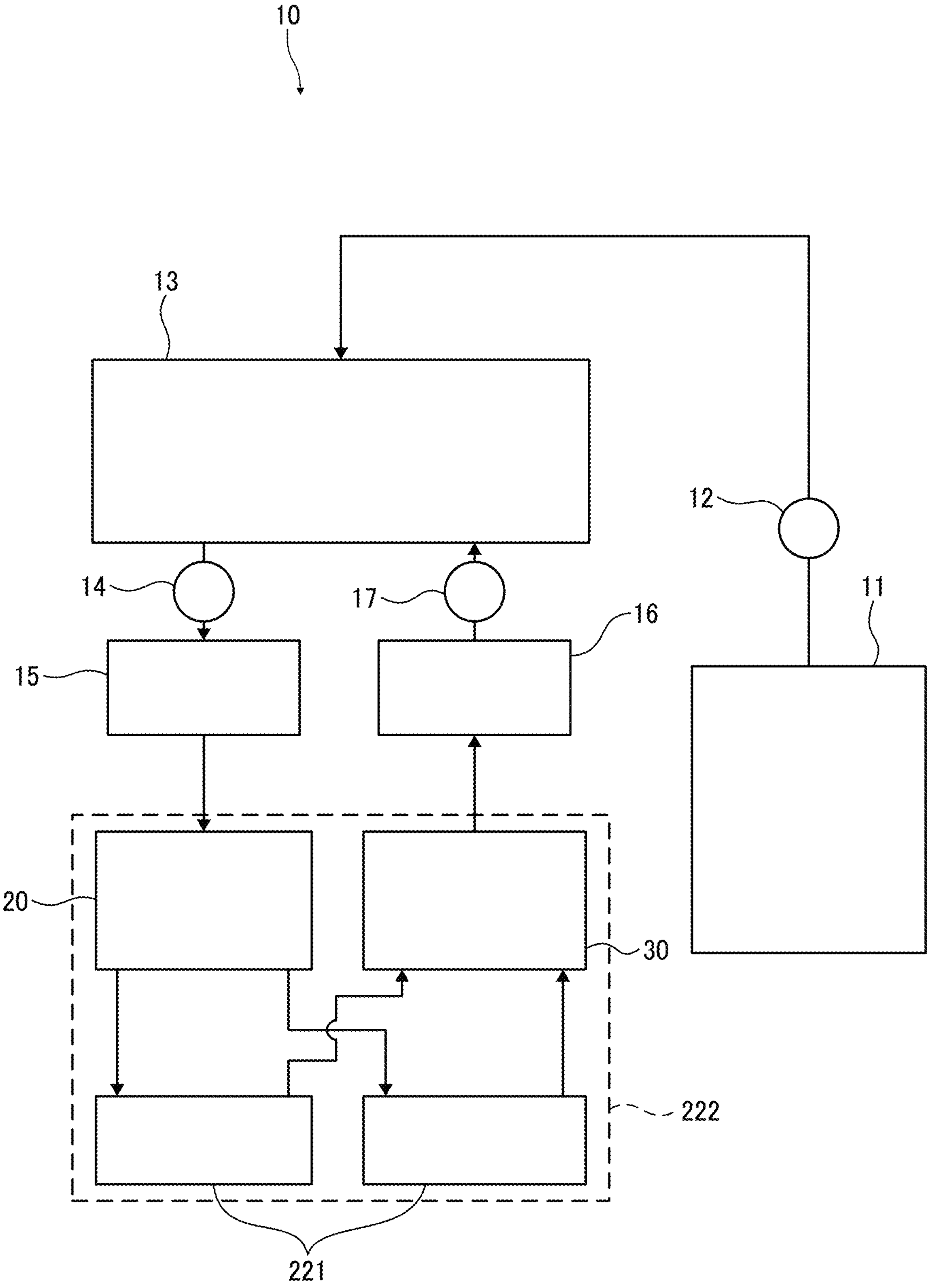
FIG. 5 is a diagram for explaining a configuration of a liquid circulation mechanism.

FIG. 5 is a diagram for explaining a configuration of a liquid circulation mechanism 10 to circulate liquid. The liquid circulation mechanism 10 includes a main tank 11, an intermediate sub tank 13, a supply sub tank 15, and a discharge sub tank 16 as units to store a liquid discharged from the liquid discharge heads 221. The liquid circulation mechanism 10 further includes a supply pump 14 to feed liquid from the intermediate sub tank 13 to the supply sub tank 15.

Besides, the liquid circulation mechanism 10 includes a discharge pump 17 to feed liquid from the discharge sub tank 16 to the intermediate sub tank 13, and a liquid feed pump 12 to feed liquid from the main tank 11 to the intermediate sub tank 13. The liquid circulation mechanism 10 includes the supply manifold 20, which supplies liquid to the liquid discharge heads 221. The liquid circulation mechanism 10 also includes the discharge manifold 30, to which liquid is ejected from the liquid discharge heads 221.

The intermediate sub tank 13 is replenished with liquid from the main tank 11 by a liquid feeding operation by the liquid feed pump 12. The liquid feed pump 12 performs the liquid feeding operation so that the liquid in the intermediate sub tank 13 may be maintained at a specified level, based on the result of detection by a liquid level detector to detect the position (level) of the liquid in the intermediate sub tank 13.

In the present embodiment, liquid circulates following a circulation path that starts from the intermediate sub tank 13, then returns to the intermediate sub tank 13 via the supply sub tank 15, the supply manifold 20, the liquid discharge heads 221, the discharge manifold 30, and the discharge sub tank 16.

Based on the result of detection by a pressure sensor to detect the pressure in the supply manifold 20 and a pressure sensor to detect the pressure in the discharge manifold 30, the supply pump 14 and the discharge pump 17 are so controlled as to circulate liquid so that a specified meniscus pressure may be attained.

The configuration of the liquid circulation mechanism 10 is not limited to the configuration illustrated in FIG. 5 as an example. For instance, the intermediate sub tank 13 may be omitted so as to send the liquid in the discharge sub tank 16 or the liquid in the main tank 11 directly to the supply sub tank 15.

Next, characteristic parts of the present embodiment are described.

The supply manifold 20 and the discharge manifold 30 (hereinafter collectively referred to as "the manifold" if the supply manifold 20 and the discharge manifold 30 are not particularly distinguished from each other) are rectangular-parallelepipedic in shape. A damper constituting part of a wall of the manifold is quadrangular in shape. Such technology involves the following issue.

If bubbles are present in the manifold, the bubbles may flow into the liquid discharge heads so as to cause such a fault as poor discharge. For this reason, the manifold needs to be filled with liquid so that no bubbles may be left in the manifold during an initial filling with the liquid. The air in the manifold, however, may come out unfavorably so as to leave bubbles in upper four corners of the manifold if the manifold is rectangular-parallelepipedic in shape.

In some cases, the supply manifold 20 and the discharge manifold 30 are set at high pressures (that is to say, the discharge manifold 30 is set at a high negative pressure and the supply manifold 20 is set at a high positive pressure) so that the specified meniscus pressure may be attained, and liquid may be sent against a channel resistance owing to a pressure difference between the supply manifold 20 and the discharge manifold 30. The dampers 22 and 32 need to be made not to leak liquid even under such high pressures.

On the other hand, the dampers 22 and 32 need to take the form of the thinnest film possible in order to favorably absorb the vibration of the liquid discharge heads 221 as propagated to the supply manifold 20 and the discharge manifold 30. Thus, the material to be used for the dampers 22 and 32 is thin-filmy, highly reliable with respect to the resistance to high pressures, and, accordingly, expensive, so that it is preferable to give the dampers 22 and 32 the smallest area possible.

In the present embodiment, the supply manifold 20 and the discharge manifold 30 are given a shape allowing an easy coming out of air and all the reduction possible in area of the dampers 22 and 32. The characteristic parts of the present embodiment are described below with reference to the drawings.

Figure 6A:
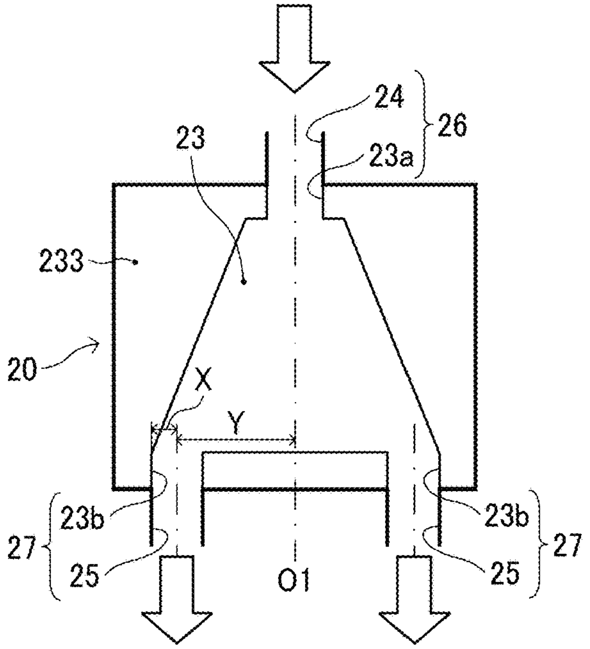
FIG. 6A is a schematic cross-sectional view of a supply manifold in a main scanning direction.
Figure 6B:
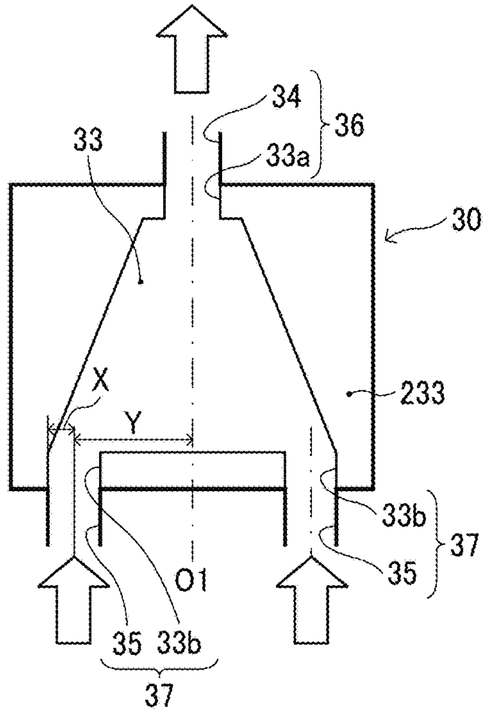
FIG. 6B is a schematic cross-sectional view of a discharge manifold in the main scanning direction.

FIGS. 6A and 6B are schematic cross-sectional views of the supply manifold 20 and the discharge manifold 30 in the main scanning direction (longitudinal direction of the supply manifolds 20 and the discharge manifold 30).

FIG. 6A is a cross-sectional view of the supply manifold 20, and FIG. 6B is a cross-sectional view of the discharge manifold 30.

As illustrated in FIGS. 6A and 6B, the supply manifold 20 and the discharge manifold 30 in the present embodiment have a trapezoidal shape widening downward from as an upper end of each of the liquid chambers 23 and 33. The supply manifold 20 includes the liquid chamber 23 on the supply side, which is concave in shape and is provided on the base member 223*a*. In a center in the main scanning direction of a top wall of the liquid chamber 23 on the supply, a supply tank coupler 26 to be coupled with the supply sub tank 15 through the supply pipe is provided.

The top walls (opposite walls) of the liquid chambers 23 and 33 are also referred to as the upper end of each of the liquid chambers 23 and 33.

The supply tank coupler 26 includes the liquid inlet 23*a* and the supply pipe adapter 24 fitted to the liquid inlet 23*a*. The supply tank coupler 26 may be two or more in number. In addition, a plurality of tanks may be coupled to the supply tank coupler 26.

Thus, the manifold (20, 30) includes: a liquid chamber (23) including an elastic damper (22), the liquid chamber (23) configured to store a liquid; multiple head couplers (27, 37) on a lower end of the liquid chamber (23), the multiple couplers configured to be respectively coupled to multiple liquid discharge heads (221) and spaced apart in a longitudinal direction of the liquid chamber, and a tank coupler (26, 36) on an upper end of the liquid chamber (23), the tank coupler (26, 36) configured to be coupled to a tank configured to store liquid to be supplied to or discharged from the manifold. A length of the liquid chamber (23) increases from the tank coupler (26, 36) on the upper end toward the multiple head couplers (27, 37) on the lower end of the liquid chamber.

At both ends in the main scanning direction of a bottom wall (lower end) of the liquid chamber 23 on the supply side, supply head couplers 27 to be coupled to the liquid discharge heads 221 through head supply pipes are provided. Each supply head coupler 27 includes a liquid outlet 23*b* and a head supply pipe adapter 25 fitted to the liquid outlet 23*b*. To the head supply pipe adapter 25, one end of one head supply pipe with the other end fitted to the liquid discharge head 221 is fitted.

The supply head couplers 27 may be also referred to as "multiple head couplers".

The bottom walls (orthogonal walls) of the liquid chambers 23 and 33 are also referred to as a lower end of each of the liquid chambers 23 and 33.

The supply head couplers 27 are provided at both ends in the main scanning direction of the bottom wall (lower end) so as to maximize the distance between the supply head couplers 27. Such configuration makes it possible to favorably prevent the vibration of the liquid discharge head 221 as propagated to the supply manifold 20 through one supply head coupler 27 from being further propagated to the other supply head coupler 27. As a result, generation of crosstalk is favorably suppressed.

Preferably, a distance Y from a center position in the main scanning direction of a bottom wall (lower end) of the supply manifold 20 to the supply head coupler 27 is equal to or larger than a distance X from the supply head coupler 27 to an end in the main scanning direction of the bottom wall (lower end) of the supply manifold 20 ($Y \geq X$), as illustrated in FIG. 6A.

More preferably, Y is from 2X to 20X. Such relationship makes it possible to prevent the vibration of the liquid discharge head 221 as propagated to the supply manifold 20 through one supply head coupler 27 from being further propagated to the other supply head coupler 27 and suppress the generation of crosstalk.

The supply manifold 20 is supplied with liquid from the supply sub tank 15 through the supply tank coupler 26, and distributes and supplies the liquid to the respective liquid discharge heads 221 through the supply head couplers 27.

As illustrated in FIG. 6B, the discharge manifold 30 is similar in configuration to the supply manifold 20, and a discharge tank coupler 36 to be coupled to the discharge sub tank 16 through the discharge pipe is provided in a center in the main scanning direction of a top wall (opposite wall). The discharge tank coupler 36 includes the liquid outlet 33*a* and the discharge pipe adapter 34 fitted to the liquid outlet 33*a*.

The supply tank coupler 26 and the discharge tank coupler 36 may be collectively referred to as a "tank coupler".

To the discharge pipe adapter 34, one end of the discharge pipe is fitted, and the other end of the discharge pipe is fitted to the discharge sub tank 16. The discharge tank coupler 36 may be two or more in number. In addition, a plurality of tanks may be coupled to the discharge tank coupler 36.

At both ends in the main scanning direction of a bottom wall (lower end) of the liquid chamber 33 on the discharge side, discharge head couplers 37 to be coupled to the liquid discharge heads 221 through head discharge pipes are provided. Each discharge head coupler 37 includes a liquid inlet 33*b* and a head discharge pipe adapter 35 fitted to the liquid inlet 33*b*. To the head discharge pipe adapter 35, one end of one head discharge pipe with the other end fitted to the liquid discharge head 221 is fitted.

The supply head couplers 27 and the discharge head couplers 37 may be collectively referred to as "head couplers (27, 37)" or "multiple head couplers (27, 37)".

The discharge head couplers 37 are provided at both ends in the main scanning direction of the bottom wall (lower end) so as to maximize the distance between the discharge head couplers 37. Such configuration makes it possible to favorably prevent the vibration of the liquid discharge head 221 as propagated to the discharge manifold 30 through one discharge head coupler 37 from being further propagated to the other discharge head coupler 37. As a result, generation of crosstalk is favorably suppressed.

As to the discharge manifold 30 also, it is preferable that a distance Y from a center position in the main scanning direction of a bottom wall (lower end) of the discharge manifold 30 to the discharge head coupler 37 is equal to or larger than a distance X from the discharge head coupler 37 to an end in the main scanning direction of the bottom wall (lower end) of the discharge manifold 30 ($Y \geq X$). More preferably, Y is from 2X to 20X. Such relationship makes it possible to prevent the vibration of the liquid discharge head 221 as propagated to the discharge manifold 30 through one discharge head coupler 37 from being further propagated to the other discharge head coupler 37 and suppress the generation of crosstalk.

The discharge manifold 30 is narrowed toward the discharge tank coupler 36, so that, during the filling with liquid, the air in the discharge manifold 30 gathers at the discharge tank coupler 36 and is favorably ejected through the discharge tank coupler 36. Such configuration suppresses remaining of air in the discharge manifold 30 after the filling with liquid and formation of bubbles.

The air (bubbles) remaining in the supply manifold 20 after the filling with liquid gathers (gather) in the vicinity of the supply tank coupler 26. After the filling with liquid, the liquid in the supply manifold 20 is sent by the supply pump 14 (see FIG. 5) to the supply sub tank 15 so as to cause the air in the supply manifold 20 to come out. During such operation, the bubbles gathering in the vicinity of the supply tank coupler 26 are discharged to the supply sub tank 15 through the supply tank coupler 26. As a result, the air remaining in the supply manifold 20 is favorably ejected, which favorably suppresses remaining of air in the supply manifold 20.

Figure 7:
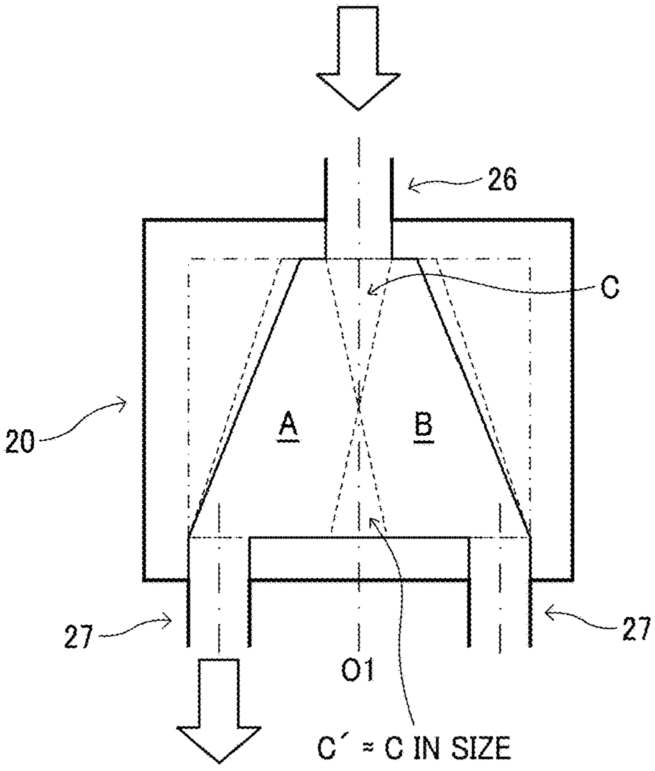
FIG. 7 is a diagram for explaining absorption of vibration of a liquid discharge head as propagated to the supply manifold.

FIG. 7 is a diagram for explaining absorption of vibration of the liquid discharge head 221 as propagated to the supply manifold 20. The following explanation is made about the supply manifold 20, while the same explanation applies to the discharge manifold 30. As compared with the case, in which the damper 22 as an elastic body is made quadrangular as illustrated with alternately long- and short-dashed lines in FIG. 7, the damper 22 is reduced in area and material cost as well. Consequently, the cost of the damper 22 can be cut down so as to reduce the cost of an apparatus.

The area of the damper 22 is a factor required for the attenuation of the vibration as propagated to the supply manifold 20 through the supply head couplers 27.

If each of a size and a shape of a damper A and a size and a shape of a damper B is made parallelogram as illustrated in FIG. 7, a part C in which the dampers A and B overlap with each other is produced in an upper part of the liquid chamber 23.

The size and the shape of a damper A is determined to attenuate the vibration as propagated to the supply manifold 20 through one supply head coupler 27.

The size and the shape of a damper B is determined to attenuate the vibration as propagated to the supply manifold 20 through the other supply head coupler 27.

On the other hand, a part C' that neither the damper A nor the damper B occupies is produced below. The part C and the part C' are identical in size. Therefore, with the damper 22 being made trapezoidal in shape, the part C produced above, in which the dampers A and B overlap each other, is compensated with a part corresponding to the part C', which neither the damper A nor the damper B occupies. It is thus possible to get hold of areas on a damper that are required for the attenuation of vibration of the respective supply head couplers 27 even if the damper is made trapezoidal in shape.

Figure 8:
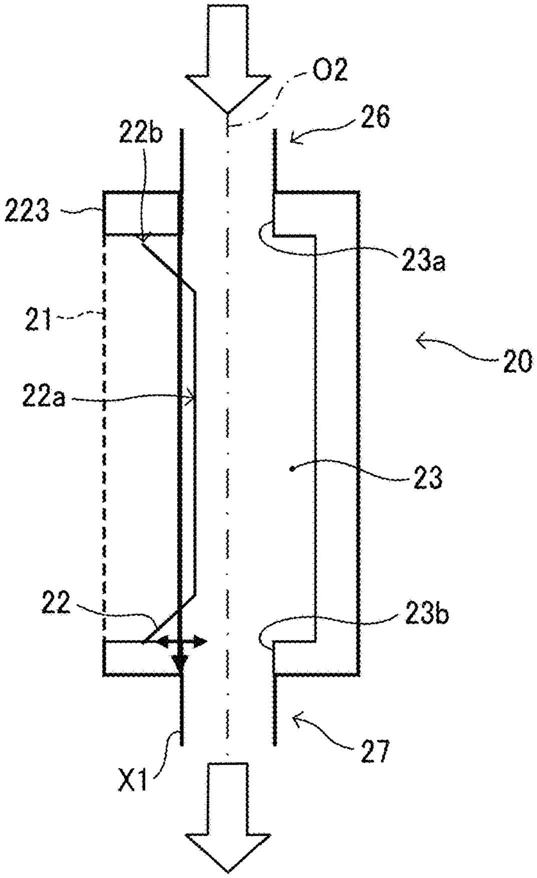
FIG. 8 is a schematic cross-sectional view of the supply manifold in a sub-scanning direction.

FIG. 8 is a schematic cross-sectional view of the supply manifold 20 in a sub-scanning direction (transverse direction of the supply manifold 20 and the discharge manifold 30). The following description is made on the supply manifold 20, while the same description applies to the discharge manifold 30. As seen from FIG. 8, the supply head couplers 27 and the supply tank coupler 26 are each provided in a center O2 in the sub-scanning direction of the supply manifold 20 in a cross section in the sub-scanning direction. As described above, the damper 22 is shaped such that the central portion **22*a* protrudes toward the liquid chamber 23**.

As a result, a peripheral portion **22*b* of the damper 22 fitted to the base member 223*a* is located further outside than the central portion 22*a* of the damper 22. Such shape results in an adequate gap formed between the central portion 22*a* of the damper 22 and the protective cover 21. The gap prevents the damper 22 from hitting upon the protective cover 21 when the damper 22 is elastically deformed to absorb the vibration of the liquid discharge head 221 as propagated to the supply manifold 20. Consequently, the vibration of the liquid discharge heads 221 as propagated to the supply manifold 20 is favorably absorbed by the damper 22** and crosstalk is favorably suppressed.

The central portion **22*a* of the damper 22 is preferably located, in the sub-scanning direction, between a line (plane) of the center O2 in the sub-scanning direction (transverse direction) of the supply manifold 20 and a line (plane) X1 connecting an upper end on a damper side of the supply head coupler 27 and a lower end on the damper side of the supply tank coupler 26, as illustrated in FIG. 8**.

Such configuration makes it possible to suppress the inhibition of flow of the liquid in the supply manifold 20 (liquid flows from the supply tank coupler 26 toward the supply head couplers 27) as compared with the case, in which the central portion **22*a* of the damper 22 is located further inside than the center O2 in the sub-scanning direction of the supply manifold 20**.

It is also made possible to favorably prevent the damper 22 from hitting upon the protective cover 21 when the damper 22 is elastically deformed to absorb the vibration of the liquid discharge head 221 as propagated to the supply manifold 20, as compared with the case, in which the central portion **22*a* of the damper 22 is located further outside than the line X1**.

In other words, positioning of the central portion **22*a* of the damper 22 between the center O2 in the sub-scanning direction of the supply manifold 20 and the line X1 allows not only an enhanced damping function but ensured liquid flows from the supply tank coupler 26 toward the supply head couplers 27**.

Next, another example of the liquid discharging apparatus according to the present embodiment is described with reference to FIGS. 9 and 10.

Figure 9:
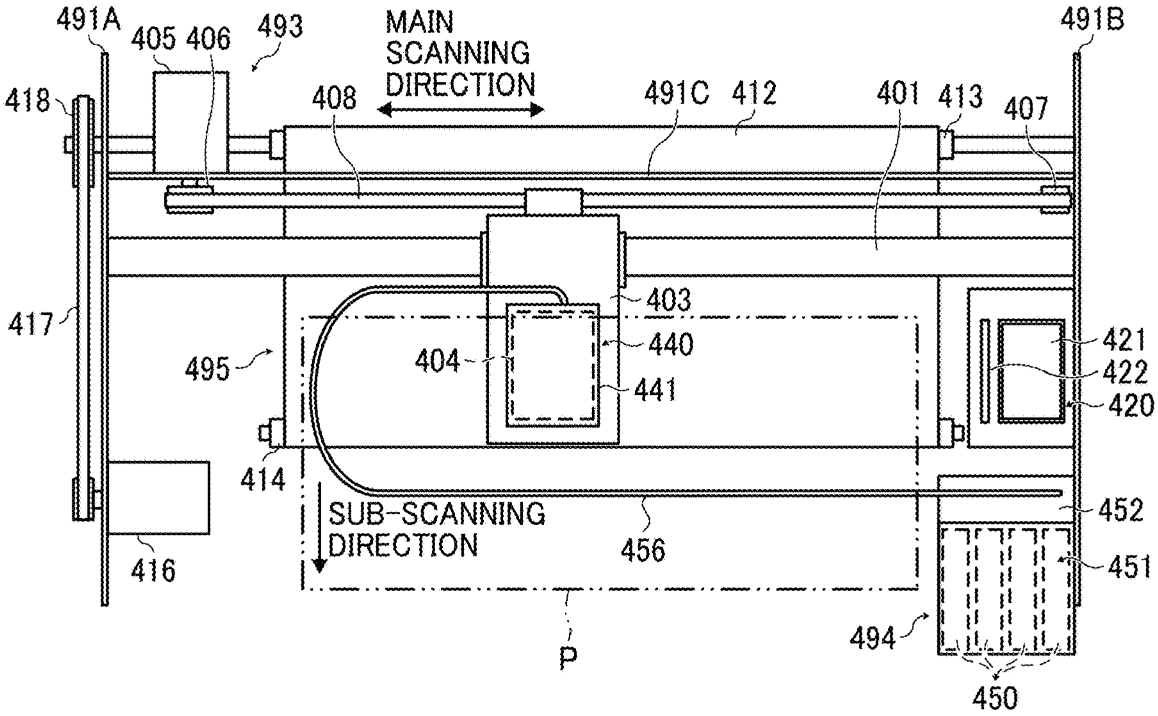
FIG. 9 is a plan view illustrating a principal part of another example of a liquid discharging apparatus.
Figure 10:
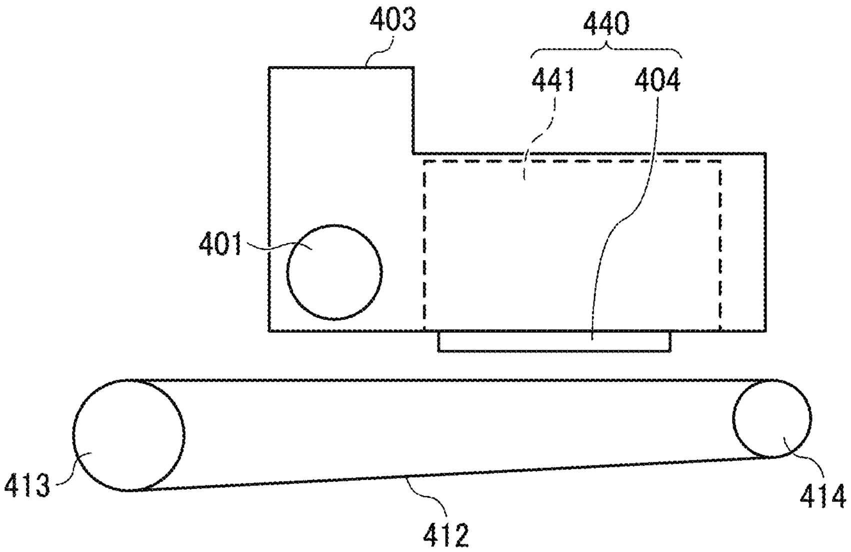
FIG. 10 is a side view illustrating the principal part of the liquid discharging apparatus in FIG. 9.

FIG. 9 is a plan view illustrating a principal part of a liquid discharging apparatus as another example, and FIG. 10 is a side view illustrating the principal part of the liquid discharging apparatus in FIG. 9.

The apparatus illustrated in FIGS. 9 and 10 is a serial type apparatus, and includes a carriage 403 that is reciprocated by a main scanning moving mechanism 493 in the main scanning direction. The main scanning moving mechanism 493 includes a guide member 401, a main scan motor 405, and a timing belt 408. The guide member 401 is extended between side plates 491A and 4918 on the left and right and movably holds the carriage 403. The main scan motor 405 reciprocates the carriage 403 in the main scanning direction through the timing belt 408 put over a driving pulley 406 and a driven pulley 407.

On the carriage 403, a liquid discharge device 440 integrally including a head device 404 according to the present embodiment and a head tank 441 is mounted. As an example, the liquid discharge device 440 includes head devices 404 for yellow (Y), cyan (C), magenta (M), and black (K) colors, similarly to the liquid discharge device 230 in the embodiment as described above. Each head device 404 includes at least one head module 222 similar to the head module 222 in the embodiment as described above.

To the head tank 441, liquid stored in a liquid cartridge 450 is supplied by a supply mechanism 494 for supplying liquid stored outside the head device 404 to the head device 404.

The supply mechanism 494 includes a cartridge holder 451 serving as a filling part that the liquid cartridge 450 is to be attached to, a tube 456, and a liquid feed device 452 including a liquid feed pump. The liquid cartridge 450 is detachably attached to the cartridge holder 451. The liquid feed device 452 feeds liquid from the liquid cartridge 450 to the head tank 441 through the tube 456.

This apparatus includes a conveyance mechanism 495 for conveying the sheet P. The conveyance mechanism 495 includes a conveyance belt 412 as a means of conveyance, and a sub scan motor 416 for driving the conveyance belt 412.

The conveyance belt 412 attracts the sheet P so as to convey the sheet P to a position opposite to the head device 404. The conveyance belt 412 is an endless belt and is put over a conveyance roller 413 and a tension roller 414. Attraction of the sheet P can be carried out by electrostatic attraction or air suction.

The sub scan motor 416 rotationally drives the conveyance roller 413 through a timing belt 417 and a timing pulley 418 so as to cause the conveyance belt 412 to circle in the sub-scanning direction.

On one side in the main scanning direction of the carriage 403, a maintenance mechanism 420 to maintain and restore the head device 404 is arranged on a lateral side of the conveyance belt 412.

The maintenance mechanism 420 includes a cap member 421 to cap a nozzle face (face where a nozzle is formed) of the head device 404 and a wiper member 422 to wipe the nozzle face, for instance.

The main scanning moving mechanism 493, the supply mechanism 494, the maintenance mechanism 420, and the conveyance mechanism 495 are fitted to a housing including the side plates 491A and 491B as well as a backboard 491C.

On the apparatus with the configuration as above, the sheet P is fed and attracted onto the conveyance belt 412 so as to convey the sheet P in the sub-scanning direction by the circling of the conveyance belt 412.

The carriage 403 is moved in the main scanning direction and, at the same time, the head devices 404 are driven according to image signals, so as to discharge liquid to form an image on the sheet P as stopped.

The apparatus as described above thus includes a liquid discharge head according to the present embodiment, so that the apparatus allows a stable formation of high quality images.

Figure 11:
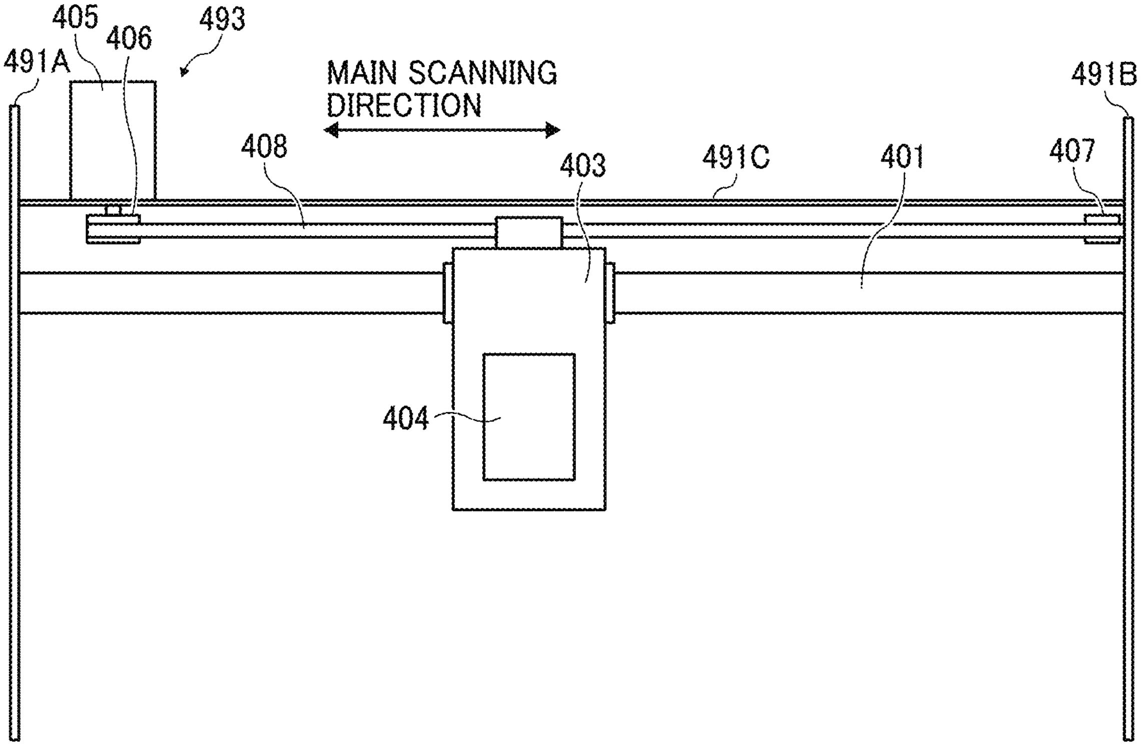
FIG. 11 is a plan view illustrating a principal part of another example of the liquid discharge unit.

Next, another example of the liquid discharge device is described with reference to FIG. 11. FIG. 11 is a plan view illustrating a principal part of a liquid discharge device as another example.

The liquid discharge device in FIG. 11 includes, among the components of the liquid discharging apparatus as described above, the housing including the side plates 491A and 491B as well as the backboard 491C, the main scanning moving mechanism 493, the carriage 403, and the head device 404.

This liquid discharge device may further include at least either of the maintenance mechanism 420 and the supply mechanism 494, which is fitted to the side plate 491B, for instance.

Figure 12:
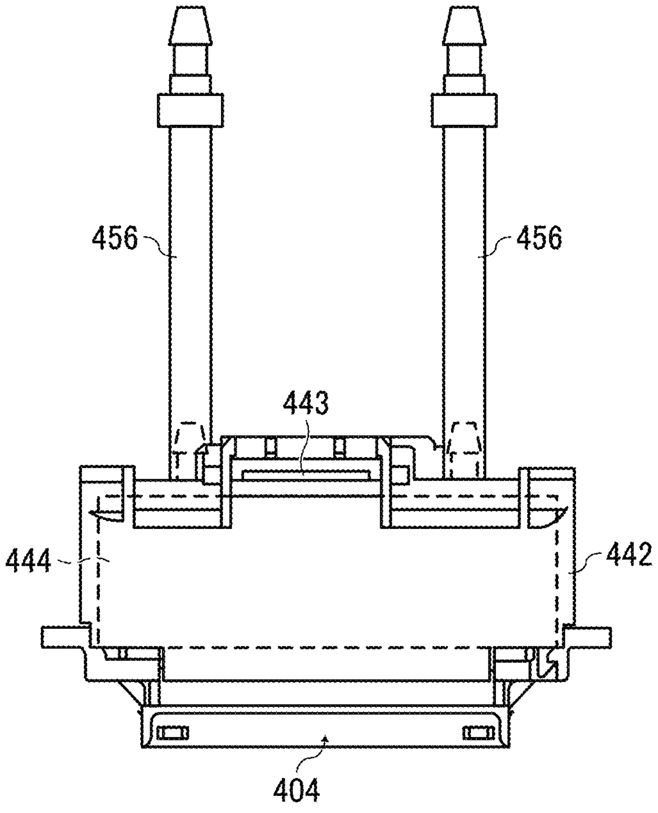
FIG. 12 is a front view illustrating yet another example of the liquid discharge unit.

Next, yet another example of the liquid discharge device according to the present embodiment is described with reference to FIG. 12. FIG. 12 is a front view illustrating a liquid discharge device as yet another example.

The liquid discharge device 440 in FIG. 12 includes the head device 404, to which a channel part 444 is fitted, and the tube 456, which is coupled to the channel part 444.

The channel part 444 is arranged inside a cover 442. Instead of the channel part 444, the head tank 441 may be included. Above the channel part 444, a connector 443 to make an electrical connection with the head device 404 is provided.

In the present application, the liquid discharging apparatus refers to an apparatus that includes a liquid discharge head, a liquid discharge head device or a head device and drives a liquid discharge head so as to cause the liquid discharge head to discharge liquid. Examples of the liquid discharging apparatus include not only an apparatus capable of discharging liquid to an object where the liquid is adherable but an apparatus to discharge liquid into a gas or liquid.

The liquid discharging apparatus can include a device concerning the feed, conveyance or ejection of an object where liquid is adherable, a preprocessing device, a post-processing device, and the like.

Thus, the liquid discharging apparatus is exemplified by an image forming apparatus to discharge ink so as to form an image on a sheet, and a stereo-modeling apparatus (three-dimensional fabrication apparatus) to discharge a fabrication liquid to a powder bed obtained by forming powder into layered stuff, in order to produce a stereo-modeled product (three-dimensionally modeled product).

In addition, the liquid discharging apparatus is not limited to an apparatus that allows a meaningful image of a character, a figure or the like to be visualized with the liquid as discharged. An exemplary liquid discharging apparatus may form a pattern that has no meaning in itself or a three-dimensional image.

The above-mentioned object where liquid is adherable refers to an object where liquid is adherable at least temporarily, with examples of such object including an object where the adhered liquid is firmly fixed and an object which the adhered liquid permeates. Specific examples include a recording material, such as a sheet, a recording paper, a recording sheet, a film, and cloth, an electronic component, such as an electronic board and a piezoelectric element, and such media as a powder bed (powder layer), an organ model, and a cell for examination, and any such objects are included unless the object where liquid is adherable is particularly limited.

The object where liquid is adherable may be made of such a material as paper, thread, fiber, cloth, leather, metal, plastics, glass, wood, ceramics, a construction material such as wallpaper and flooring, or a textile for clothing, as long as liquid is adherable to the material even temporarily.

Exemplary liquids include ink, a treatment liquid, a DNA sample, a resist, a pattern material, a binding agent, and a fabrication liquid, as well as a solution and a dispersion each containing an amino acid, protein, and calcium.

The liquid discharging apparatus may be an apparatus that relatively moves the liquid discharge head and the object where liquid is adherable, to which apparatus the liquid discharging apparatus is not limited.

Specifically, the liquid discharging apparatus may also be a serial type apparatus that moves the liquid discharge head or a line type apparatus that does not move the liquid discharge head.

The liquid discharging apparatus is further exemplified by a treatment liquid application apparatus to discharge a treatment liquid to a sheet in order to apply the treatment liquid onto a surface of the sheet for the purpose of surface modification of the sheet or other purpose, and a jet granulation apparatus to inject, through a nozzle, a composition liquid prepared by dispersing raw materials into a solution, so as to form particulates of the raw materials.

The liquid discharge device includes an operating part or a mechanism that is integrated with a liquid discharge head, that is to say, the liquid discharge device is an aggregate of parts and mechanisms related to the discharge of liquid. Examples of the liquid discharge device include a liquid discharge device including at least one among a head tank, a carriage, a supply mechanism, a liquid circulation mechanism, a maintenance mechanism, and a main scanning moving mechanism, as a combination with the liquid discharge head.

Examples of such integrated configuration include the configuration, in which the liquid discharge head and the operating part or the mechanism are secured to each other through fastening, bonding, engagement or the like, and the configuration, in which either of the liquid discharge head and the operating part or the mechanism is held movably with respect to the other. Besides, the liquid discharge head and the operating part or the mechanism may be formed detachably from each other.

In an exemplary liquid discharge device, a head device and a head tank are integrated with each other, as in the liquid discharge device 440 illustrated in FIG. 10, in which the head device 404 and the head tank 441 are integrated with each other. In another exemplary liquid discharge device, a head device and a head tank are coupled to each other through a tube or the like so as to integrate the head device and the head tank with each other. A unit including a filter may be added between the head tank and the head device of each of the above exemplary liquid discharge devices.

In another exemplary liquid discharge device, a head device and a carriage are integrated with each other.

In another exemplary liquid discharge device, a head device is movably held by a guide member constituting part of a scanning moving mechanism, so as to integrate the head device and the scanning moving mechanism with each other. In another exemplary liquid discharge device, a head device, a carriage, and a main scanning moving mechanism are integrated with one another, as is the case with the liquid discharge device illustrated in FIG. 11.

In an exemplary liquid discharge device, a cap member constituting pan of a maintenance mechanism is secured to a carriage that a head device is fitted to, so as to integrate the head device, the carriage, and the maintenance mechanism with one another.

In another exemplary liquid discharge device, a tube is coupled to a head device that a head tank or a channel part is fitted to, so as to integrate the head device, a supply mechanism, and a circulation mechanism with one another, as is the case with the liquid discharge device illustrated in FIG. 12.

The main scanning moving mechanism is assumed to include a single guide member. The supply mechanism is assumed to include a single tube and a single charging part.

The liquid discharge head is not limited in the actuator to be used. Besides the piezoelectric element as described in the above embodiment (which may be replaced by a multilayer piezoelectric element), a thermal actuator using a thermoelectric conversion element such as a heat generating resistor or an electrostatic actuator including a diaphragm and a counter electrode may be used for the liquid discharge head.

In the present application, the terms "image forming" "recording", "printing", "imaging". "print making", and "fabrication" are assumed as synonymous with one another.

The above embodiment is presented as an example, and no limitations of the scope of the present embodiment are intended. The described embodiment, which is novel, can be implemented in various other embodiments, and various omissions, replacements, and changes are possible without departing from the gist of the invention. The embodiment as above and modifications of the embodiment fall within the scope or gist of the invention, and fall within the scope of the invention as recited in the claims and the equivalence of such invention.

The embodiment as described above is merely an example, and characteristic effects are achieved in each of the following aspects.

[First Aspect]

A manifold (20, 30) includes: a liquid chamber (23) including an elastic damper (22), the liquid chamber (23) configured to store a liquid; multiple head couplers (27, 37) on a lower end of the liquid chamber (23), the multiple couplers configured to be respectively coupled to multiple liquid discharge heads (221) and spaced apart in a longitudinal direction of the liquid chamber; and a tank coupler (26, 36) on an upper end of the liquid chamber (23), the tank coupler (26, 36) configured to be coupled to a tank configured to store liquid to be supplied to or discharged from the manifold. A length of the liquid chamber (23) increases from the tank coupler (26, 36) on the upper end toward the multiple head couplers (27, 37) on the lower end of the liquid chamber.

A manifold coupled to a plurality of liquid discharge heads includes: an elastic body, such as a damper, forming part of a wall to store liquid; two head couplers to be coupled to the liquid discharge heads, which units are provided in an orthogonal wall (bottom wall (lower end) of either of the liquid chambers 23 and 33 in the present embodiment) orthogonal to a wall including the elastic body; and a tank coupler to be coupled to a tank (the supply sub tank 15 or the discharge sub tank 16 in the present embodiment), which unit is provided in an opposite wall (top wall of either of the liquid chambers 23 and 33 in the present embodiment) opposite to the orthogonal wall.

The "opposite wall" is also referred to as the "upper end" of each of the liquid chambers 23 and 33.

The two head couplers are spaced apart in a longitudinal direction of the orthogonal wall (the main scanning direction in the present embodiment), and the elastic body has a shape widening from the opposite wall toward the orthogonal wall. In order to cause the elastic body to favorably exert a damping function to attenuate the vibration generated in liquid chambers of the liquid discharge heads and propagated to the liquid in the manifold through the head couplers, it is necessary to make the elastic body thin.

A thin elastic body, however, is prone to cause a liquid leakage. An elastic body having a function that satisfies both of a required thinness and a suppressed liquid leakage is expensive, which contributes to the increase in cost of an apparatus. In view of the above, the present applicant made an intensive examination.

As a result, it has been found that the damping function is not deteriorated even if the elastic body is given a shape widening from the opposite wall toward the orthogonal wall so as to reduce the area on the tank coupler side of the elastic body as compared with the area on the head coupler side.

In this first aspect, the elastic body is given a shape widening from the opposite wall toward the orthogonal wall, based on the finding as above. Consequently, it is possible to reduce the elastic body in area as compared with a quadrangular elastic body without deteriorating the damping function of the elastic body, so as to reduce the cost of an apparatus.

[Second Aspect]

The manifold (20, 30) according to the first aspect, wherein the liquid chamber (23) has a shape of trapezoid, the upper end of the liquid chamber (23) corresponds to an upper base of the trapezoid, and the lower end of the liquid chamber (23) corresponds to a lower base of the trapezoid.

In the first aspect, the opposite wall is an upper wall, and a liquid storage to store liquid, such as the liquid chambers 23 and 33, has a shape widening from above downward in a cross section in the longitudinal direction such as the main scanning direction. As described in the above embodiment, such configuration makes it possible to collect bubbles in the manifold in the vicinity of a center in the longitudinal direction of the opposite wall. Therefore, if the tank coupler is provided in the center in the longitudinal direction of the opposite wall, the bubbles in the manifold are favorably ejected through the tank coupler.

[Third Aspect]

The manifold (20, 30) according to the second aspect, wherein the tank coupler (26, 36) is in a center in the longitudinal direction of the liquid chamber (23).

In the second aspect, the tank coupler is provided in the center in the longitudinal direction such as the main scanning direction of the opposite wall. As described in the above embodiment, such configuration makes it possible to favorably eject the bubbles in the manifold through the tank coupler.

[Fourth Aspect]

The manifold (20, 30) according to the first aspect, wherein the multiple head couplers (27, 37) includes two head couplers at both ends of the lower end in the longitudinal direction of the liquid chamber (23).

In any one of the first through third aspects, the head couplers are provided at both ends in the longitudinal direction of the orthogonal wall. As described in the above embodiment, such configuration makes it possible to separate one head coupler and the other head coupler to the maximum and favorably suppress the generation of so-called crosstalk, in which the vibration of a liquid discharge head as propagated inside the manifold through one head coupler is propagated to another liquid discharge head through the other head coupler.

[Fifth Aspect]

The manifold (20, 30) according to the first aspect, wherein a peripheral portion (22*b*) of the elastic damper (22) is disposed outside of a central portion (22*a*) of the elastic damper (22) in a transverse direction orthogonal to the longitudinal direction of the liquid chamber (23).

In any one of the first through fourth aspects, a peripheral portion of the elastic body such as the damper is located further outside than a central portion of the elastic body in a cross section in a transverse direction of the orthogonal wall. As described in the above embodiment, such configuration makes it possible to enlarge a gap between the central portion of the elastic body and a component (the protective cover 21 in the present embodiment) opposite to an outer face of the elastic body as compared with the case, in which the central portion of the elastic body is located in the same position where the peripheral portion is located.

Consequently, the elastic body is prevented from hitting upon the component opposite to the outer face of the elastic body and the elastic deformation of the elastic body is not inhibited when the elastic body is elastically deformed to absorb the vibration of a liquid discharge head as propagated to the manifold. Thus, the elastic body favorably absorbs the vibration of a liquid discharge head as propagated to the manifold.

[Sixth Aspect]

The manifold (20, 30) according to the fifth aspect, wherein a central portion (22*a*) of the elastic damper (22) protrudes toward an interior of the liquid chamber (23).

In the fifth aspect, the elastic body such as the damper is shaped such that the central portion protrudes toward the inside of the manifold. Such configuration makes it possible to make the peripheral portion of the elastic body located further outside than the central portion of the elastic body in the cross section in the transverse direction when the elastic body is fitted to the manifold.

[Seventh Aspect]

The manifold (20, 30) according to the fifth aspect, wherein the multiple head couplers (27, 37) and the tank coupler (26, 36) are disposed in a center (O2) of the liquid chamber (23) in the transverse direction; and the central portion (22*a*) of the elastic damper (22) is disposed between a plane (X1), which connects an upper end of the multiple head couplers (27, 37) on an elastic damper (22) side and a lower end of the tank coupler (26, 36) on an elastic damper (22) side, and a plane of a center (O2) of the liquid chamber (23) in the transverse direction.

In the fifth or sixth aspect, in the cross section in the transverse direction, the head couplers and the tank coupler are provided in a center in the transverse direction. The central portion of the elastic body such as the damper is located between the center in the transverse direction and the line X1 that connects the end on the elastic body side of the head coupler and the end on the elastic body side of the tank coupler. As described in the above embodiment, such configuration makes it possible to prevent the elastic body from inhibiting the liquid flows between the tank coupler and the head couplers in the manifold, and provide an adequate gap between the central portion of the elastic body and the component (the protective cover 21 in the present embodiment) opposite to the outer face of the elastic body.

[Eighth Aspect]

A head module (222) includes: multiple liquid discharge heads (221); and the manifold (20, 30) according to the first aspect.

The head module 222 includes a plurality of liquid discharge heads and the manifold in any one of the first through seventh aspects. The head module 222 is as such reduced in cost. In addition, the head module 222, in which the damping function is given to the manifold, results in the downsizing of an apparatus as compared with the head module, in which the damping function is given to each liquid discharge head.

[Ninth Aspect]

The head module (222) according to the eighth aspect, wherein the manifold (20, 30) includes a supply manifold (20) configured to feed the liquid to the multiple liquid discharge heads (221).

The head module (222) according to eighth aspect, wherein the manifold (20, 30) includes a discharge manifold (30) configured to collect the liquid discharged from the multiple liquid discharge heads (221).

In the eighth aspect, the manifold includes at least one of a supply manifold to send liquid to the liquid discharge heads and a discharge manifold to receive liquid sent from the liquid discharge heads.

[Tenth Aspect]

A liquid discharge device (440) includes the head module (222) according to the eighth aspect.

A liquid discharge device includes the manifold in any one of the first through seventh aspects or the head module in the eighth or ninth aspect. This liquid discharge device is as such reduced in cost. In addition, such liquid discharge device results in the downsizing of an apparatus as compared with the liquid discharge device, in which the damping function is given to each liquid discharge head.

[Eleventh Aspect]

A liquid discharging apparatus (1) includes the liquid discharge device (440) according to the tenth aspect.

A liquid discharging apparatus includes the liquid discharge device in the tenth aspect. This liquid discharging apparatus is as such reduced in cost.

According to the present embodiment, the cost of an apparatus is reduced.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A manifold comprising:

a liquid chamber including an elastic damper, the liquid chamber configured to store a liquid;

multiple head couplers on a lower end of the liquid chamber, the multiple head couplers configured to be respectively coupled to multiple liquid discharge heads and spaced apart in a longitudinal direction of the liquid chamber; and a tank coupler on an upper end of the liquid chamber, the tank coupler configured to be coupled to a tank configured to store liquid to be supplied to or discharged from the manifold, wherein a length of the liquid chamber increases from the tank coupler on the upper end toward the multiple head couplers on the lower end of the liquid chamber, and wherein the liquid chamber has a shape of trapezoid, the upper end of the liquid chamber corresponds to an upper base of the trapezoid, and the lower end of the liquid chamber corresponds to a lower base of the trapezoid.

2. The manifold according to claim 1, wherein;

the tank coupler is in a center in the longitudinal direction of the liquid chamber.

3. The manifold according to claim 1, wherein:

the multiple head couplers includes two head couplers at both ends of the lower end in the longitudinal direction of the liquid chamber.

4. A manifold comprising:

a liquid chamber including an elastic damper, the liquid chamber configured to store a liquid;

multiple head couplers on a lower end of the liquid chamber, the multiple head couplers configured to be respectively coupled to multiple liquid discharge heads and spaced apart in a longitudinal direction of the liquid chamber; and a tank coupler on an upper end of the liquid chamber, the tank coupler configured to be coupled to a tank configured to store liquid to be supplied to or discharged from the manifold, wherein a length of the liquid chamber increases from the tank coupler on the upper end toward the multiple head couplers on the lower end of the liquid chamber, and wherein a peripheral portion of the elastic damper is disposed outside of a central portion of the elastic damper in a transverse direction orthogonal to the longitudinal direction of the liquid chamber.

5. The manifold according to claim 4, wherein:

a central portion of the elastic damper protrudes toward an interior of the liquid chamber.

6. The manifold according to claim 4, wherein:

the multiple head couplers and the tank coupler are disposed in a center of the liquid chamber in the transverse direction; and the central portion of the elastic damper is disposed between a plane, which connects an upper end of the multiple head couplers on an elastic damper side and a lower end of the tank coupler on the elastic damper side, and a plane of a center of the liquid chamber in the transverse direction.

7. A head module, comprising:

multiple liquid discharge heads; and a manifold including:

a liquid chamber including an elastic damper, the liquid chamber configured to store a liquid;

multiple head couplers on a lower end of the liquid chamber, the multiple head couplers configured to be respectively coupled to the multiple liquid discharge heads and spaced apart in a longitudinal direction of the liquid chamber; and a tank coupler on an upper end of the liquid chamber, the tank coupler configured to be coupled to a tank configured to store liquid to be supplied to or discharged from the manifold, wherein a length of the liquid chamber increases from the tank coupler on the upper end toward the multiple head couplers on the lower end of the liquid chamber, and wherein the manifold includes a discharge manifold configured to collect the liquid discharged from the multiple liquid discharge heads.

8. The head module according to claim 7, wherein:

the manifold includes a supply manifold configured to feed the liquid to the multiple liquid discharge heads.

9. A liquid discharge device comprising the head module according to claim 7.

10. A liquid discharging apparatus comprising the liquid discharge device according to claim 9.

11. The head module according to claim 7, wherein: the liquid chamber has a shape of trapezoid, the upper end of the liquid chamber corresponds to an upper base of the trapezoid, and the lower end of the liquid chamber corresponds to a lower base of the trapezoid.

12. The head module according to claim 11, wherein: the tank coupler is in a center in the longitudinal direction of the liquid chamber.

13. The head module according to claim 7, wherein: the multiple head couplers includes two head couplers at both ends of the lower end in the longitudinal direction of the liquid chamber.

14. The head module according to claim 7, wherein: a peripheral portion of the elastic damper is disposed outside of a central portion of the elastic damper in a transverse direction orthogonal to the longitudinal direction of the liquid chamber.

15. The head module according to claim 14, wherein: a central portion of the elastic damper protrudes toward an interior of the liquid chamber.

16. The head module according to claim 14, wherein: the multiple head couplers and the tank coupler are disposed in a center of the liquid chamber in the transverse direction; and the central portion of the elastic damper is disposed between a plane, which connects an upper end of the multiple head couplers on an elastic damper side and a lower end of the tank coupler on the elastic damper side, and a plane of a center of the liquid chamber in the transverse direction.

* * * * *